US 6,728,933 B1

(12) United States Patent
Heenehan

(10) Patent No.: US 6,728,933 B1
(45) Date of Patent: Apr. 27, 2004

(54) SYSTEM AND METHOD FOR IMPORTING DATA

(75) Inventor: Jaime W. Heenehan, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/337,070

(22) Filed: Jun. 21, 1999

Related U.S. Application Data
(60) Provisional application No. 60/106,926, filed on Nov. 3, 1996.

(51) Int. Cl.[7] ............................................. G06F 17/00
(52) U.S. Cl. ........................ 715/508; 715/523; 715/524
(58) Field of Search ................. 707/523, 503, 707/506, 507, 508, 515, 516, 524; 715/515, 523, 524, 516, 508

(56) References Cited

U.S. PATENT DOCUMENTS

| | | | | |
|---|---|---|---|---|
| 5,228,123 A | * | 7/1993 | Heckel | 345/762 |
| 5,339,434 A | | 8/1994 | Rusis | 395/700 |
| 5,497,491 A | | 3/1996 | Mitchell et al. | 395/700 |
| 5,564,044 A | | 10/1996 | Pratt | 395/600 |
| 5,634,124 A | | 5/1997 | Khoyi et al. | 395/614 |
| 5,687,373 A | | 11/1997 | Holmes et al. | 395/682 |
| 5,752,018 A | * | 5/1998 | Sheffield | 707/2 |
| 6,195,662 B1 | * | 2/2001 | Ellis et al. | 707/103 R |
| 6,259,445 B1 | * | 7/2001 | Hennum et al. | 345/709 |
| 6,304,857 B1 | * | 10/2001 | Heindel et al. | 705/34 |
| 6,334,778 B1 | * | 1/2002 | Brown | 434/258 |
| 6,368,273 B1 | * | 4/2002 | Brown | 600/300 |

OTHER PUBLICATIONS

Boyce et al., "Using Microsoft Office 97", copyright 1997 by Que Corporation, pp. 10–11, 67–73, 139–199.*

Morilleau, "Oleword—visual basic, vb, vbscript", http://www.planet–source–code.com/vb/scripts/ShowCode.asp?txtCodeId=1038&IngWId=1, published Sep. 10, 1998, pp. 1–12.*

J. Sillers. "Distributed Build Tool". *IBM Technical Disclosure Bulletin*, vol. 40, No. 6, 06–97, p. 141–144.

J. Ishikura, et al. "Dynamic Data Exchange Method Among Applications on Heterogeneous Platform". *IBM Technical Disclosure Bulletin*, vol. 37, No. 6B, 06–94, p. 21–22.

* cited by examiner

*Primary Examiner*—Stephen S. Hong
*Assistant Examiner*—Gregory J. Vaughn
(74) *Attorney, Agent, or Firm*—Shelley M Beckstrand

(57) ABSTRACT

Data is imported into a word processor application, such as Lotus WordPro, on a non-Windows workstation. Data is set in power fields in a first platform using a script program attached to the first platform to retrieve data from a formatted text file into which an agent inserted the data from a second platform. The first platform may be a Lotus WordPro SmartMaster, the script program may be a Lotus script, and the second platform may be a Lotus Notes application.

4 Claims, 1 Drawing Sheet

SYSTEM AND METHOD FOR IMPORTING DATA

CROSS REFERENCE TO RELATED APPLICATION

This application claims priority under 35 U.S.C. 119(e) of U.S. patent provisional application Ser. No. 60/106,926 filed Nov. 3, 1998 for SYSTEM AND METHOD FOR IMPORTING DATA.

BACKGROUND OF THE INVENTION

1. Technical Field of the Invention

This invention pertains to importing data into a word processor application. More particularly, it pertains to the importation of data into Lotus WordPro on a non-Windows workstation.

2. Background Art

In Lotus Notes version 4 (and below) and Lotus Word Pro 96, in a WIN-OS/2 environment (i.e., OS2), there is not an existing method for sharing data between a Notes document and a Word Pro document, aside from manually cutting and pasting data.

SUMMARY OF THE INVENTION

In accordance with the invention, one to many data fields may be passed from a Notes document to specified target fields in a WordPro document. In accordance with a further aspect of the invention, customized WordPro documents may be built dynamically using WordPro Smartmasters in a building block methodology.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
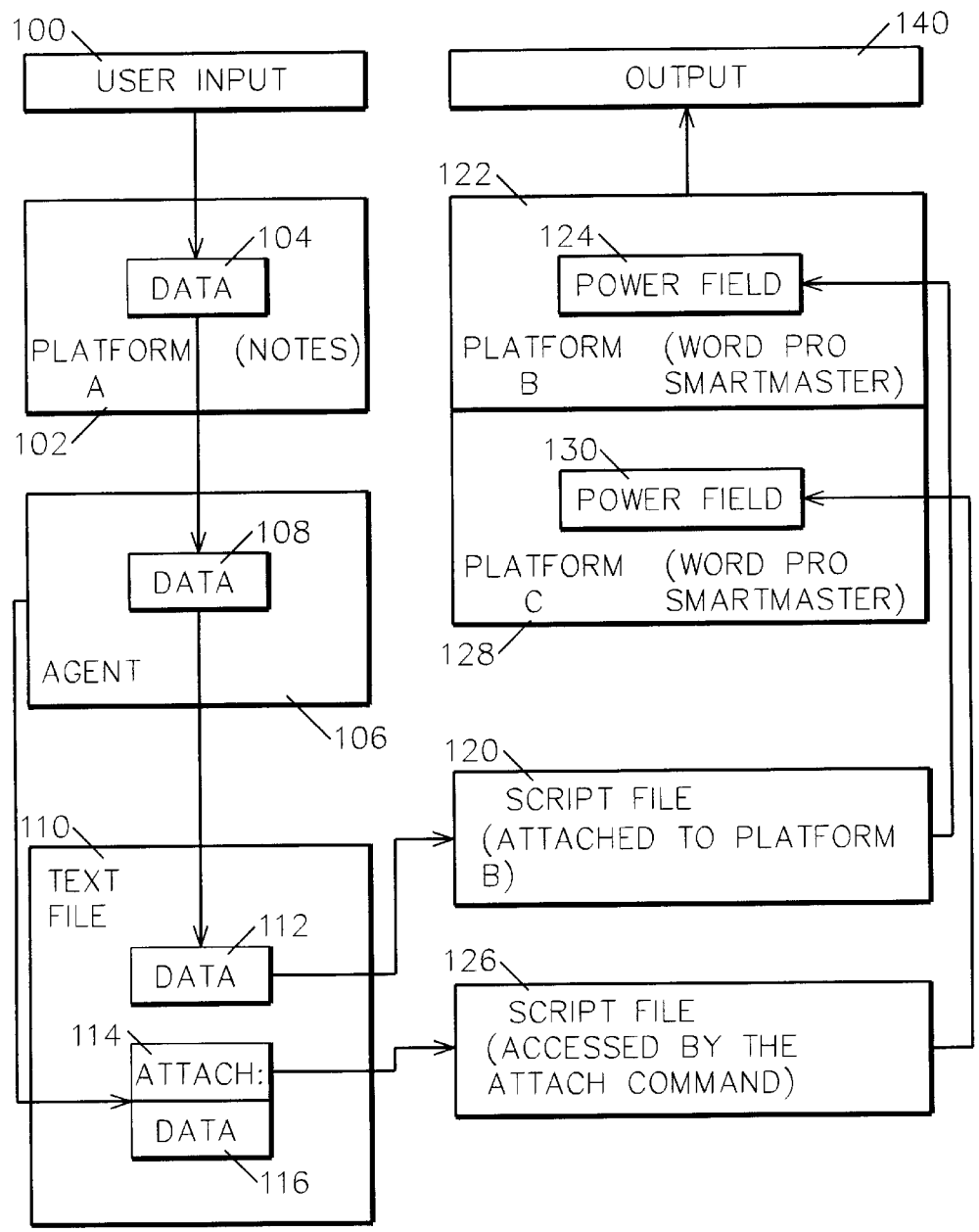
FIG. 1 is a high level flow diagram illustrating the system and method of the invention.

Referring to FIG. 1, in accordance with the preferred embodiment of the invention, data is set in power fields 124 in a first platform 122 using script program 120 attached to the first platform 122 to retrieve data 112 from a formatted text file 110 into which an agent 106 inserted the data 104 from a second platform 102. In this preferred embodiment, first platform 122 is a Lotus WordPro SmartMaster, script program 120 is a Lotus script, and second platform 102 is a Lotus Notes application.

In accordance with the method of the invention, three basic procedures are executed.

First, first platform 122, such as a WordPro platform, creates the WordPro Smartmaster of the skeleton document that needs to have data imported from the external source (in this case, Lotus Notes). Within this smartmaster document, platform 122 determines where the source data elements must be inserted, and creates a WordPro Powerfield 124 at those places in smartmaster 122. Powerfields are user defined variable fields.

Second, data source 102 (in this case, Lotus Notes), creates a simple keyed text file 110 of data to be mapped into the WordPro document 122. This text file comprises the following elements: the name of the WordPro powerfield 124 in target WordPro smartmaster 122 where this piece of data 112 is to be placed; the name of the Notes data field 104 (optional, but recommended for clarity); the data 112 itself to be put in the WordPro document. This process is repeated for each instance of the data to be shared. Optionally, the special keyword ATTACH 114 is used in place of the Powerfield name to trigger WordPro to insert a specified SmartMaster 128 at the end of the current Smartmaster 122. In the second element 116 of this record 110, the name of the WordPro SmartMaster to insert is specified.

Third, WordPro writes a small program 120 in Lotus Script to read the text file 110 created above. This program 120 is saved with the Smartmaster 122 and run whenever a document is created using that SmartMaster 122. This is a generic program 120 that reads the text file 110 and for each record 112 does the following: read the first value of the record, which is the Powerfield 124 name; find that Powerfield 124 in the Smartmaster 122; update that field 124 with the data found in the third element of the record; if the first value contains the value ATTACH 114, then go to the end of the current division of the Smartmaster 122, create a new division 128 and insert the name of the Smartmaster supplied in value two of this record. This methodology now enables the external data source 102 to dynamically build a WordPro document 140, using one to many additonal Smartmasters 122, 128, and populate them with data 112, 116 from Notes 102.

In accordance with an exemplary embodiment of the invention, an application is built to support a Contract Administration group in building customized sales agreements. This group has an established base contract agreement that is common to all agreement types. Depending on the type of agreement, there is certain data that is required specific to that type. That data is attached to the base agreement, and signed by both a company representative and the customer as one document.

The process is as follows:

First, Lotus Notes is used to gather information needed to create the contract. After the data is input into the information form on Notes, then Notes workflow is used to route the document to various people for their approval, comments, or updates. The information form consists of (a) general customer information, including name, address, and key contacts, and (b) contract specific information, including type of contract (such as Technology 1 or Technology 2), prices, and schedules.

Second, when the information form has been completed and approved, the text file of data to be transferred to WordPro is created. Table 1 sets forth an example text file.

TABLE 1

EXAMPLE TEXT FILE

"MAIN" , "MAIN" , "MAIN"
"<COMP>", "COMPANY", "ABC Test"
"<STRT>", "Street", "123 north/south st"
"<CITY>", "CityStZip", "anywhere, ny 13850"
"<CNTY>", "Country", " "
"<DAT1>", "EffectDate", "November 11, 1997"
"<DAT2>", "ExpireDate", "November 11, 2001"
"<AGREE>", "AgreementNumber", "W000129"
"ENDDIV", "ENDDIV", "ENDDIV"
"ATTACH", "ASICTP7.MWP", "ATTACH"
"<NUM1>", "Attachments", "1"
"<AGR2>", "AgreementNumber", "W000129"
"<PRT1>", "prototypes", "ten(10)"
"<MINO>", "minOrderQty", "five hundred(500"
"done", "Listnum", "W000129"

Third, WordPro creates a SmartMaster for the base agreement with the following elements:
(a) Static text consisting of the common wording of the agreement.
(b) Definitions of the following Powerfields for placement where needed in the document: <COMP>, <STRT>, <CITY>, <CNTY>, <DAT1>, <DAT2>, and <AGREE>.

Fourth, WordPro creates a SmartMaster for a technology specific attachment ASICT07.MWP with the following elements:
(a) Static text consisting of the common wording for the attachment.
(b) Definitions of the following Powerfields for placment where needed in the document: <NUM1>, <AGR2>, <PRT1>, and <MINO>.
(c) The Lotus Script program of Table 2 for placement in the base agreement.

TABLE 2

LOTUS SCRIPT PROGRAM

```
MAIN:
Set txtdoc = .ACTIVEDOCUMENT
      fname = "d:\wpcntrct.text"         /* Input file from Notes           */
      filenum = Freefile()
      open fname For Input As filenum%
      Call Divvalues                     /* Populate base agreement         */
      Do Until Ucase(var1) = "DONE"
            If Ucase(var1) = "ATTACHE" Then
                  Call GetNewDivision    /* Insert additional               */
                                         /*    Smartmaster                  */
                  Call Divvalues         /* Populate data in attachment     */
            End If
      Loop
      Close Filenum%
      Messagebox "Complete", 64, "Done"
      txtdoc.SAVEAS                      /* Prompt customer file name       */
END MAIN;                                /*    to save document under       */
Sub Divvalues
      /* Populate the powerfields in this division.                         */
      /* Put all the powerfields defined in the array variable              */
      /*    PFIELDS                                                         */
      /* Read a record from the input file.                                 */
      /*    Loop through the array comparing the Powerfield names           */
      /*       specified from Notes, with those defined in the              */
      /*       SmartMaster.                                                 */
      /*    If they're equal, then update the Powerfield in the             */
      /*       document,                                                    */
      /*    If not equal, get the next Powerfield name and                  */
      /*       compare . . .                                                */
      Set pfileds = .Division.Foundry.Powerfields
      Input #filenum%, var1,var2,var3    /* read first record               */
                                         /* from Notes                      */
      Do Until (Ucase(var1) = "ATTACH" Or Ucase(VAR1) = "DONE")
            var4 = """" & var3 & """"
            Forall Powerfield In pfields
                  pfname1 = powerfield.EXTRACTTEXT
                  If Ucase(pfname1) = Ucase(var1) Then
                        Powerfield.SETFIELDFORMULA(var4)
                        Powerfield.UPDATE
                        Exit Forall
                  End If
            End Forall
            Input #filenumb%, var1,var2,var3    /* read next record         */
                                                /* from Notes               */
      Loop
End Sub
Sub GetNewDivision
      /* Create a new division with the Smart master specified,             */
      /*    and insert                                                      */
      Dim fullfilename As String
      fullfilename = Var2
      .CREATEDVISION fullfilename, "",
$LWPDivLocInsertAfterCurrentDiv, "", ""
End Sub
```

Advantages Over the Prior Art

The advantages of the system and method of the preferred embodiment of this invention include enabling data inserted in a first platform to be attached to a second platform.

Alternative Embodiments

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Accordingly, the scope of protection of this invention is limited only by the following claims and their equivalents.

I claim:

1. A method for creating an output document including power fields set in a first platform from a formatted text file, comprising:

creating a skeleton document having a first division including first static text and named powerfields within said static text for receiving data imported from an external data source;

creating a keyed text file including a plurality of data elements to be mapped into said skeleton document, each data element of said keyed text file including a first portion and a second portion, said data element selectively (a) including in said first portion a name of a power field in said skeleton document with said second portion including data, or (b) including in said first portion an attach indicia with said second portion including indicia identifying an attach script file;

creating and saving with said skeleton document a base script file for writing data from said keyed text file into said named powerfields;

responsive to a selected data element including said name of a powerfield in said first division, executing said base script file to write data from said second portion of said selected data element to a corresponding powerfield of said first division of said skeleton document;

responsive to a selected data element including said attach indicia, creating a second division of said skeleton document including further static text, named powerfields within said further static text, and inserting into said second division said attach script file; and executing said attach script file for populating powerfields of said second division of said skeleton document with data from said second portion of selected data elements of said keyed text file.

2. A program storage device readable by a machine, tangibly embodying a program of instructions executable by a machine to perform method steps for creating an output document, said method steps comprising:

creating a skeleton document having a first division including first static text and named powerfields within said static text for receiving data imported from an external data source;

creating a keyed text file including a plurality of data elements to be mapped into said skeleton document, each data element of said keyed text file including a first portion and a second portion, said data element selectively including (a) in said first portion a name of a power field in said skeleton document with said second portion including data, or (b) including in said first portion an attach indicia with said second portion including indicia identifying an attach script file;

creating and saving with said skeleton document a base script file for writing data from said keyed text file into said named powerfields;

responsive to a selected data element including said name of a powerfield in said first division, executing said base script file to write data from said second portion of said selected data element to a corresponding powerfield of said first division of said skeleton document;

responsive to a selected data element including said attach indicia, creating a second division of said skeleton document including further static text, named powerfields within said further static text, and inserting into said second division said attach script file; and executing said attach script file for populating powerfields of said second division of said skeleton document with data from said second portion of selected data elements of said keyed text file.

3. An article of manufacture comprising:

a computer useable medium having computer readable program code means embodied therein for creating an output document, the computer readable program means in said article of manufacture comprising:

computer readable program code means for causing a computer to effect creating a skeleton document having a first division including first static text and named powerfields within said static text for receiving data imported from an external data source;

computer readable program code means for causing a computer to effect creating a keyed text file including a plurality of data elements to be mapped into said skeleton document, each data element of said keyed text file including a first portion and a second portion, said data element selectively including (a) in said first portion a name of a power field in said skeleton document with said second portion including data, or (b) including in said first portion an attach indicia with said second portion including indicia identifying an attach script file;

computer readable program code means for causing a computer to effect creating and saving with said skeleton document a base script file for writing data from said keyed text file into said named powerfields;

computer readable program code means for causing a computer to effect responsive to a selected data element including said name of a powerfield in said first division, executing said base script file to write data from said second portion of said selected data element to a corresponding powerfield of said first division of said skeleton document;

computer readable program code means for causing a computer to effect responsive to a selected data element including said attach indicia, creating a second division of said skeleton document including further static text, named powerfields within said further static text, and inserting into said second division said attach script file; and computer readable program code means for causing a computer to effect executing said attach script file for populating powerfields of said second division of said skeleton document with data from said second portion of selected data elements of said keyed text file.

4. A system for creating an output document, comprising:

means for creating a skeleton document having a first division including first static text and named powerfields within said static text for receiving data imported from an external data source;

means for creating a keyed text file including a plurality of data elements to be mapped into said skeleton document, each data element of said keyed text file including a first portion and a second portion, said data element selectively including (a) in said first portion a name of a power field in said skeleton document with said second portion including data, or (b) including in said first portion an attach indicia with said second portion including indicia identifying an attach script file;

means for creating and saving with said skeleton document a base script file for writing data from said keyed text file into said named powerfields;

means for responsive to a selected data element including said name of a powerfield in said first division, executing said base script file to write data from said second portion of said selected data element to a corresponding powerfield of said first division of said skeleton document;

means for responsive to a selected data element including said attach indicia, creating a second division of said skeleton document including further static text, named powerfields within said further static text, and inserting into said second division said attach script file; and means for executing said attach script file for populating powerfields of said second division of said skeleton document with data from said second portion of selected data elements of said keyed text file.

\* \* \* \* \*